United States Patent
Faust et al.

(10) Patent No.: US 10,618,361 B2
(45) Date of Patent: Apr. 14, 2020

(54) PIN-DROP HITCH MOUNT ASSEMBLY WITH BIASED PIN RETAINER MECHANISM

(71) Applicant: Deere & Company, Moline, IL (US)

(72) Inventors: Jeremy J. Faust, Ottumwa, IA (US); Stephen K. Parsons, Ottumwa, IA (US); Roger D. Stephenson, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 167 days.

(21) Appl. No.: 15/840,342

(22) Filed: Dec. 13, 2017

(65) Prior Publication Data
US 2018/0215215 A1 Aug. 2, 2018

Related U.S. Application Data

(60) Provisional application No. 62/452,505, filed on Jan. 31, 2017.

(51) Int. Cl.
*B60D 1/02* (2006.01)
*B60D 1/52* (2006.01)

(52) U.S. Cl.
CPC ............... *B60D 1/025* (2013.01); *B60D 1/02* (2013.01); *B60D 1/52* (2013.01)

(58) Field of Classification Search
CPC .................................. B60D 1/02; B60D 1/025
See application file for complete search history.

(56) References Cited

U.S. PATENT DOCUMENTS

| 262,880 A | 8/1882 | Woods | |
| 279,654 A * | 6/1883 | Lucan | B60D 1/02 213/204 |

(Continued)

FOREIGN PATENT DOCUMENTS

| BE | 367 120 A | 2/1930 |
| CH | 319 111 A | 1/1957 |

(Continued)

OTHER PUBLICATIONS

John Deere, Mower-Conditioners and Mowers, Deere & Company specifications and parts brochure, Nov. 2016.

(Continued)

*Primary Examiner* — Kevin Hurley
(74) *Attorney, Agent, or Firm* — Klintworth & Rozenblat IP LLP

(57) ABSTRACT

A hitch mount assembly includes a drawbar receiver with a drawbar cavity and a pin opening and a pin removably received within the pin opening. A latch that is supported for movement between a first position and a second position. The latch, in the first position, is configured to engage the pin and retain the pin in a retracted position. The latch, in the second position, is configured to disengage the pin and release the pin for movement of the pin from the retracted position to the extended position. Furthermore, the hitch mount assembly includes a biasing member that biases the latch toward the first position and a pin rest configured to support the pin when the latch is in the second position. The pin rest is configured to release the pin as the latch biases from the second position to the first position and engages the pin.

19 Claims, 10 Drawing Sheets

(56) References Cited

U.S. PATENT DOCUMENTS

| | | | | |
|---|---|---|---|---|
| 279,911 A * | 6/1883 | Cate et al. | ............... | B60D 1/02 213/206 |
| 2,113,338 A * | 4/1938 | Wohldorf | ................ | B60D 1/02 280/508 |
| 2,441,285 A | 5/1948 | Pfeiffer | | |
| 2,478,736 A * | 8/1949 | Balzen | .................... | B60D 1/02 280/477 |
| 2,525,471 A * | 10/1950 | Balzer | .................... | B60D 1/02 280/508 |
| 2,556,748 A * | 6/1951 | Buckley | .................. | B60D 1/02 280/477 |
| 2,671,673 A | 4/1952 | Benson | | |
| 2,844,390 A | 7/1958 | Smith | | |
| 3,161,422 A * | 12/1964 | Wade | ..................... | B60D 1/02 280/508 |
| 3,912,302 A | 10/1975 | Patterson | | |
| 4,073,507 A | 2/1978 | Dingess | | |
| 4,133,553 A | 1/1979 | Pierce | | |
| 5,769,559 A | 6/1998 | Olson | | |
| 5,921,699 A * | 7/1999 | Olson | ..................... | B60D 1/02 280/509 |
| 6,412,570 B1 | 7/2002 | Pruitt et al. | | |
| 6,598,897 B1 | 7/2003 | Patti | | |
| 6,616,527 B2 | 9/2003 | Shinners et al. | | |
| 6,776,432 B2 | 8/2004 | Harkcom et al. | | |
| 7,478,824 B2 | 1/2009 | Buerkle et al. | | |
| 7,712,764 B2 | 5/2010 | Maillet | | |
| 7,739,015 B2 | 6/2010 | Senneff et al. | | |
| 8,469,386 B2 | 6/2013 | Clark et al. | | |
| 8,632,091 B2 | 1/2014 | Shaw et al. | | |
| 8,708,362 B2 | 4/2014 | Terpsma et al. | | |
| 8,738,244 B2 | 5/2014 | Lenz et al. | | |
| 8,746,725 B2 | 6/2014 | Harkcom et al. | | |
| 8,752,856 B2 | 6/2014 | Sarajian et al. | | |
| 8,764,042 B2 | 7/2014 | Afting | | |
| 9,168,800 B2 | 10/2015 | Smith et al. | | |
| 9,193,231 B2 | 11/2015 | Bergum et al. | | |
| 9,480,198 B2 | 11/2016 | Treffer et al. | | |
| 9,578,808 B2 | 2/2017 | Dybro et al. | | |
| 9,615,501 B2 | 4/2017 | Pickett et al. | | |
| 9,809,069 B2 | 11/2017 | Hruska et al. | | |
| 2008/0067785 A1 | 3/2008 | Buerkle | | |
| 2009/0088932 A1 | 4/2009 | Diekhans et al. | | |
| 2014/0019018 A1 | 1/2014 | Baumgarten et al. | | |
| 2015/0061261 A1 | 3/2015 | Bergum et al. | | |
| 2015/0305238 A1 | 10/2015 | Klausmann et al. | | |
| 2015/0334910 A1 | 11/2015 | Treffer et al. | | |
| 2015/0354961 A1 | 12/2015 | Reinecke et al. | | |
| 2017/0020064 A1 | 1/2017 | Doughty et al. | | |
| 2018/0215213 A1 * | 8/2018 | Faust | ...................... | B60D 1/52 |
| 2018/0215214 A1 * | 8/2018 | Faust | .................... | B60D 1/025 |
| 2018/0215216 A1 * | 8/2018 | Faust | .................... | B60D 1/025 |

FOREIGN PATENT DOCUMENTS

| | | |
|---|---|---|
| DE | 522 733 C | 4/1931 |
| DE | 44 12 088 A1 | 10/1995 |
| DE | 101 15 451 A1 | 10/2002 |

OTHER PUBLICATIONS

Extended European Search Report for European Patent Application No. 18153642.6-1015 dated Jul. 3, 2018, 7 pages.

Extended European Search Report for European Patent Application No. 18153631.9 dated Jul. 3, 2018, 7 pages.

Extended European Search Report for European Patent Application No. 18153637.6 dated Jul. 3, 2018, 7 pages.

Extended European Search Report for European Patent Application No. 18153651.7 dated Jul. 3, 2018, 7 pages.

USPTO Office Action for Utility U.S. Appl. No. 15/840,023 dated Aug. 8, 2019. 24 pages.

USPTO Office Action for Utility U.S. Appl. No. 15/840,292 dated Jun. 13, 2019. 23 pages.

USPTO Office Action for Utility U.S. Appl. No. 15/840,394 dated Aug. 5, 2019. 20 pages.

* cited by examiner

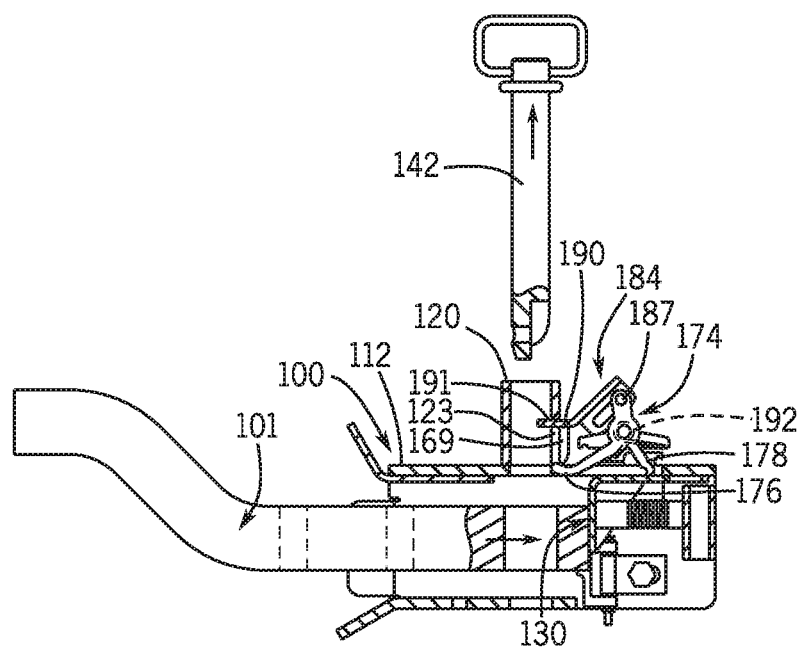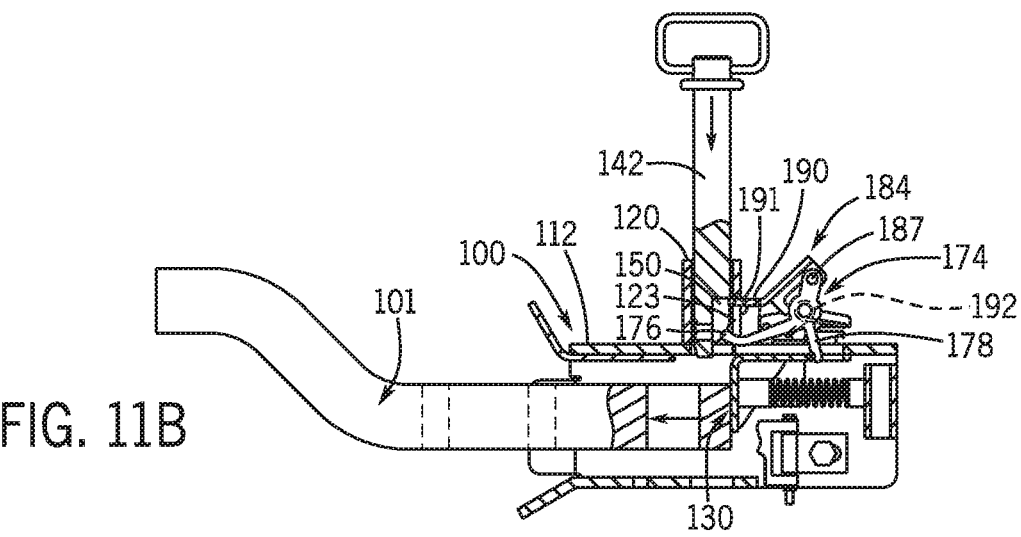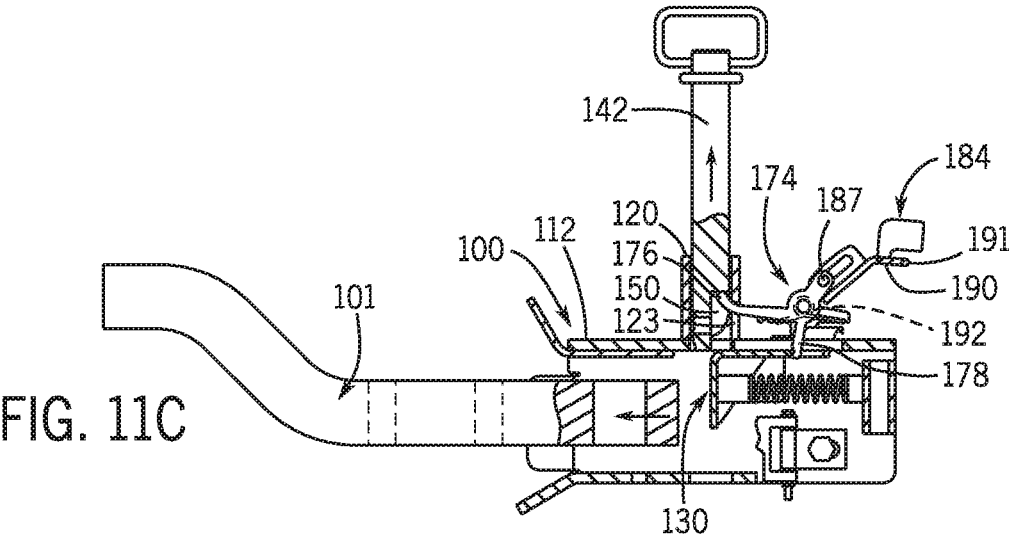

PIN-DROP HITCH MOUNT ASSEMBLY WITH BIASED PIN RETAINER MECHANISM

CROSS-REFERENCE TO RELATED APPLICATION(S)

This application claims the benefit of U.S. Provisional Application No. 62/452,505, filed on Jan. 31, 2017. The entire disclosure of the above application is incorporated herein by reference.

STATEMENT OF FEDERALLY SPONSORED RESEARCH OR DEVELOPMENT

Not applicable.

FIELD OF THE DISCLOSURE

This disclosure relates to a hitch mount assembly for towing purposes and, more specifically, relates to a hitch mount assembly with a biased pin retainer mechanism.

BACKGROUND OF THE DISCLOSURE

Some work vehicles may be configured for towing another work vehicle. A towing vehicle may removably connect (i.e., hitch) to a towed vehicle via a hitch mount assembly. As such, the towing vehicle may propel and direct the towed vehicle through a work site. An implement supported on the towed vehicle may also be used during the towing operation. Additionally, in some embodiments, the towing vehicle may be configured to supply mechanical, electrical, hydraulic, or other power to the towed vehicle for operating the implement.

Generally, one of the vehicles may include a drawbar with a first pin hole, and the other vehicle may include a drawbar receiver with a second pin hole. To hitch the vehicles, the drawbar may be inserted into the drawbar receiver, and a pin may be inserted through both the first and second pin holes. To unhitch the vehicles, the pin may be removed from the first and second pin holes, and the drawbar may be removed from the drawbar receiver.

SUMMARY OF THE DISCLOSURE

This disclosure provides a hitch mount assembly for hitching a towed vehicle and a towing vehicle together, wherein the assembly facilitates hitching and/or unhitching of the vehicles.

In one aspect, the disclosure provides a pin-drop hitch mount assembly with a drawbar receiver that defines a drawbar cavity and a pin opening. The drawbar cavity is configured to receive a drawbar. The assembly also includes a pin that is removably received within the pin opening, wherein the pin is configured to move within the pin opening between a retracted position and an extended position. The pin is configured to attach the drawbar to the drawbar receiver when in the extended position, and the drawbar receiver is configured to be detached from the drawbar with the pin in the retracted position. The assembly further includes a latch that is supported for movement between a first position and a second position. The latch, in the first position, is configured to engage the pin and retain the pin in the retracted position. The latch, in the second position, is configured to disengage the pin and release the pin for movement of the pin from the retracted position to the extended position. Furthermore, the hitch mount assembly includes a biasing member that biases the latch toward the first position and a pin rest configured to support and retain the pin relative to the drawbar receiver when the latch is in the second position. The pin rest is configured to release the pin as the latch biases from the second position to the first position and engages the pin.

In another aspect, a method of operating a pin-drop hitch mount assembly is disclosed that includes a drawbar receiver, a pin, a latch, and a pin rest. The method includes removing the pin from a pin opening of the drawbar receiver to unhitch the drawbar receiver from a drawbar. The method also includes supporting the pin on the pin rest after removing the pin and withdrawing the drawbar from the drawbar receiver with the pin supported on the pin rest. The method further includes biasing the latch to engage the pin and release the pin from the pin rest upon withdrawing the drawbar, the latch engaging the pin in an unhitched position.

In still another aspect, a pin-drop hitch mount assembly is disclosed that includes a drawbar receiver that defines a drawbar cavity and a pin receiver tube that defines a pin opening that is open to the drawbar cavity. The drawbar cavity is configured to receive a drawbar. The assembly also includes a pin that is removably received within the pin opening of the pin receiver tube. The pin is configured to move within the pin opening between a retracted position and an extended position. The pin is configured to attach the drawbar to the drawbar receiver when in the extended position. The drawbar receiver is configured to be detached from the drawbar with the pin in the retracted position. Furthermore, the assembly includes a latch that is supported by the drawbar receiver for rotational movement between a first position and a second position. The latch, in the first position, is configured to engage the pin and retain the pin in the retracted position. The latch, in the second position, is configured to disengage the pin and release the pin for movement of the pin from the retracted position to the extended position. Additionally, the assembly includes a biasing member that biases the latch toward the first position. Moreover, the assembly includes a pin rest that is supported by the drawbar receiver for rotational movement between a third position and a fourth position. The pin rest includes a projection. The pin rest is spaced apart from the pin opening when in the third position. The projection of the pin rest is received within the pin opening and configured to engage the pin when the pin rest is in the fourth position and the latch is in the second position. The pin rest is configured to release the pin as the latch biases from the second position to the first position and engages the pin.

The details of one or more embodiments are set forth in the accompanying drawings and the description below. Other features and advantages will become apparent from the description, the drawings, and the claims.

BRIEF DESCRIPTION OF THE DRAWINGS

FIGS. 9A-9C are section views of the hitch mount assembly of FIGS. 1B and 1C during a successful hitching operation, wherein FIG. 9A shows a drawbar being inserted into the hitch mount assembly, FIG. 9B shows the drawbar actuating elements of the hitch mount assembly, and FIG. 9C shows automatic movement of the pin for hitching the drawbar to the hitch mount assembly;

FIG. 10A-10C are section views of the hitch mount assembly of FIGS. 1B and 1C during a hitching attempt with pin holes misaligned, wherein FIG. 10A shows the drawbar being inserted into the hitch mount assembly, FIG. 10B shows the drawbar pin hole misaligned with the pin hole of the hitch mount assembly, and FIG. 10O shows the drawbar withdrawing causing the hitch mount assembly to bias the pin upward toward its retracted position where it is ready for another hitching attempt; and FIG. 11A-11C are section views of the hitch mount assembly during an unhitching operation, wherein FIG. 11A shows the pin being removed, FIG. 11B shows the pin being replaced and supported by the hitch mount assembly, and FIG. 11C shows the drawbar withdrawn and the hitch mount assembly biasing the pin upward toward its retracted position where it is ready for another hitching attempt.

Like reference symbols in the various drawings indicate like elements.

DETAILED DESCRIPTION

Figure 1A:
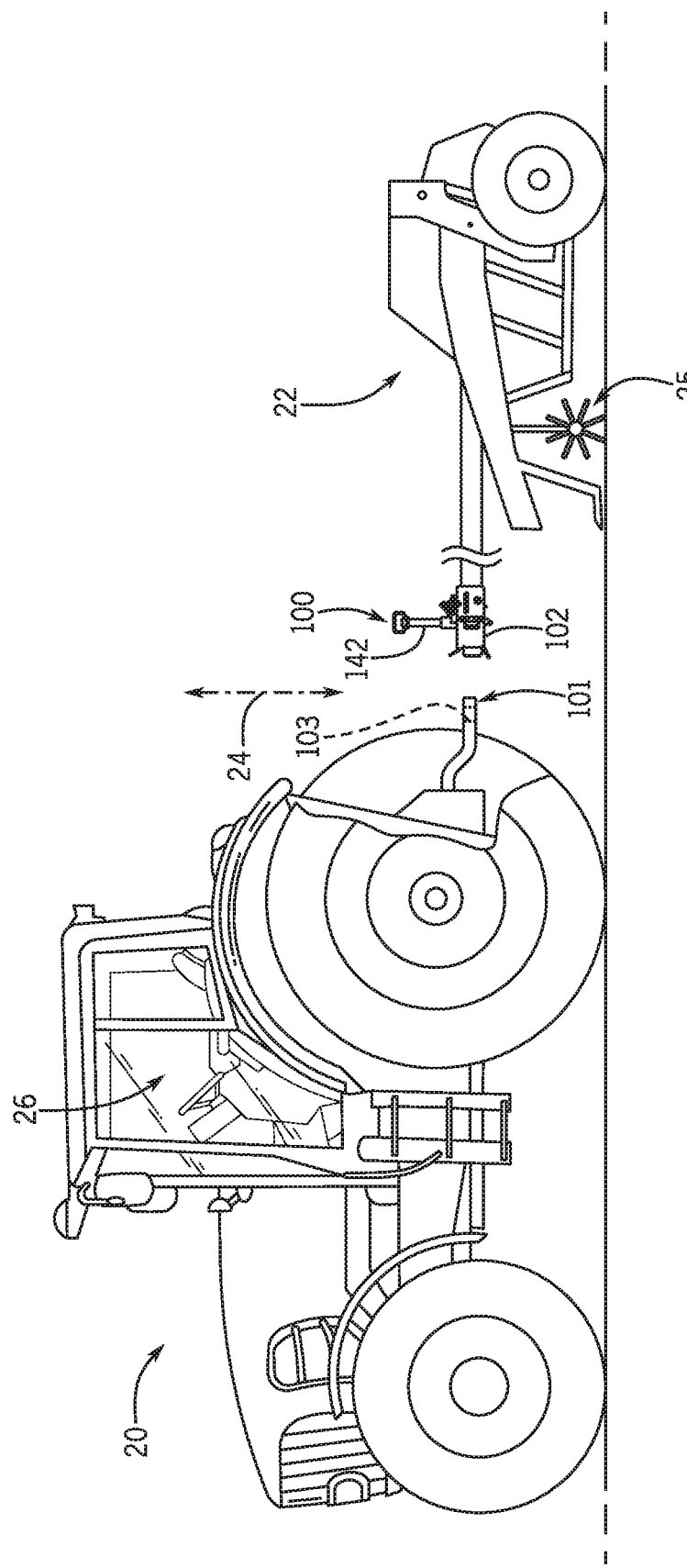
FIG. 1A is a side view of example work vehicles, including a towing vehicle and a towed vehicle, which may be hitched together and unhitched from each other using a hitch mount assembly of the present disclosure.

The following describes one or more example embodiments of a hitch mount assembly for work vehicles, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed pin-drop hitch mount assembly as shown in the accompanying figures. The disclosed pin-drop hitch mount assembly, its method of manufacture and assembly, and its method of operation provide a number of benefits as compared to conventional hitch mount assemblies.

In some embodiments, the hitch mount assembly may include various features that facilitate hitching a towed vehicle and a towing vehicle together. The hitch mount assembly may also include features that facilitate unhitching the towed vehicle from the towing vehicle.

More specifically, a pin may be employed for removably attaching (i.e., hitching) the hitch mount assembly of one vehicle to a drawbar of the other vehicle. Generally, the hitch mount assembly may allow the pin to automatically move between a retracted (unhitched) position and an extended (hitched) position.

During a hitching operation, the drawbar may be inserted in a first direction into the hitch mount assembly. If the respective pin holes of the drawbar and hitch mount assembly align, the hitch mount assembly causes the pin to automatically drop from its retracted (unhitched) position to its extended (hitched) position.

If, however, the pin holes remain misaligned during the hitching attempt, the drawbar may be removed by moving one vehicle away from the other. The drawbar may move in a second direction out of the hitch mount assembly. As a result, the hitch mount assembly may automatically move (i.e., bias and return) the pin back to its retracted position, where it will be ready for another hitching attempt. As such, the hitch mount assembly may allow for multiple attempts at hitching to the drawbar without the user having to reset the pin. Accordingly, in some embodiments, the user may remain in the operator cabin of the driven work vehicle during the multiple hitching attempts instead of having to return to the hitch mount assembly to reset the pin.

Moreover, when unhitching the work vehicles, the pin may be removed from the hitch mount assembly while the drawbar remains stationary. Then, the pin may be replaced and securely set in a temporary position on the hitch mount assembly. Next, the drawbar may be removed by moving one vehicle away from the other. As a result, the hitch mount assembly may automatically move (i.e., bias) the pin back to its retracted position, where it will be ready for the next hitching attempt. Thus, once the pin is removed and replaced, the user may simply remain in the operator cabin of the driven work vehicle, and the pin will automatically move to its retracted position.

FIG. 1A illustrates a plurality of work vehicles arranged in a work vehicle train. For example, the work vehicle train may include a towing vehicle 20 and a towed vehicle 22. The towing vehicle 20 and the towed vehicle 22 may be attached via a hitch mount assembly 100. One vehicle may include the hitch mount assembly 100, and the hitch mount assembly 100 may removably attach to a drawbar 101 of the other vehicle as will be discussed.

In the embodiment of FIG. 1A, the towed vehicle 22 includes the hitch mount assembly 100, and the towing vehicle 20 includes the drawbar 101. However, it will be appreciated that, in other embodiments, the towing vehicle 20 may include the hitch mount assembly 100 and the towed vehicle 22 may include the drawbar 101.

The towing vehicle 20 and towed vehicle 22 may be of any suitable type. For example, the towing vehicle 20 may be a tractor or other towing work vehicle. The towing vehicle 20 may include an operator cabin 26 with various user controls (e.g., steering wheel, control panels, pedals, and the like) for controlling the towing vehicle 20. Also, the towed vehicle 22 may include an implement 25 configured for agricultural, forestry, construction, or other work. In the embodiment of FIG. 1A, for example, the towed vehicle 22 is a mower/conditioner, and the implement 25 includes a plurality of mower blades for cutting grass, hay, or other agricultural product. However, the towed vehicle 22 and/or implement 25 could be of another type without departing from the scope of the present disclosure. For example, the implement 25 may be a sprayer implement, a seeding implement, etc., and the towed vehicle 22 may support movement of that implement 25.

In some embodiments, the implement 25 may include a driveline that transfers power from a power-take-off (PTO) drive assembly of the towing vehicle 20 to a powered element of the implement 25. The PTO driveline of the implement 25 connects the PTO shaft of the towing vehicle 20 and a component mounted to the frame of the towed vehicle 22 (typically a gearbox assembly mounted on the towed vehicle 22). It will be appreciated that the vehicles 20, 22 may need to turn relative to each other during towing. Achieving these turns may require significant angular deviations between the towing vehicle 20 and the towed vehicle 22, which can cause similar angular deviations, for example, of the PTO driveline. Angular deviations in a PTO driveline can cause various difficulties. Thus, the hitch mount assembly 100 may also be employed with a known swivel gearbox or and/or other similar components that allow relative turning action. The swivel gearbox assembly may allow components to rotate about a vertical axis 24 to thereby allow turning of the vehicles 20, 22. This arrangement may be different from other hitch arrangements wherein the relative turning occurs about a hitch pin. This swivel gearbox hitch system allows the PTO driveline to remain approximately straight, as the angular deviation between the towing vehicle 20 and the towed vehicle 22 occurs at a vertical axis of the swivel gearbox.

As shown in FIG. 1A, the hitch mount assembly 100 may include a drawbar receiver member 102 configured to receive the drawbar 101. The hitch mount assembly 100 may also include a pin 142. The pin 142 may extend through the drawbar receiver member 102 and a pin hole 103 within the drawbar 101 to thereby connect the drawbar 101 to the hitch mount assembly 100 (i.e., to hitch the towing vehicle 20 and the towed vehicle 22 together). Also, the pin 142 may be selectively removed from the pin hole 103 of the drawbar 101 to thereby disconnect the drawbar 101 and the hitch mount assembly 100 (i.e., to unhitch the towing vehicle 20 and the towed vehicle 22).

The embodiment of the hitch mount assembly 100 shown in FIGS. 1A-4 will now be discussed. It will be appreciated that the hitch mount assembly 100 may vary from this embodiment without departing from the scope of the present disclosure.

Figure 1B:
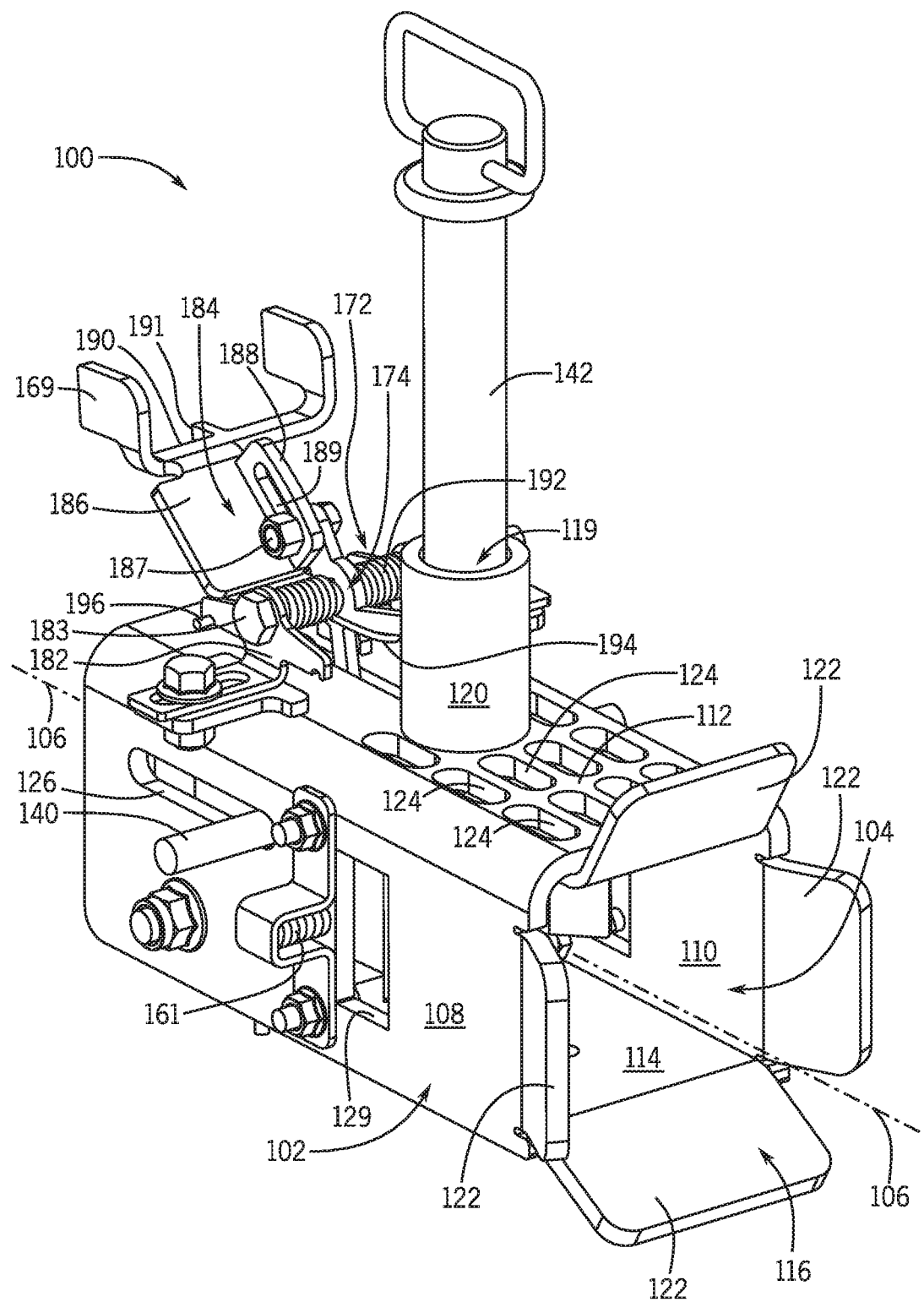
FIG. 1B is a front perspective view of an example embodiment of the hitch mount assembly of the present disclosure, which is configured for hitching and unhitching the work vehicles of FIG. 1A.
Figure 1C:
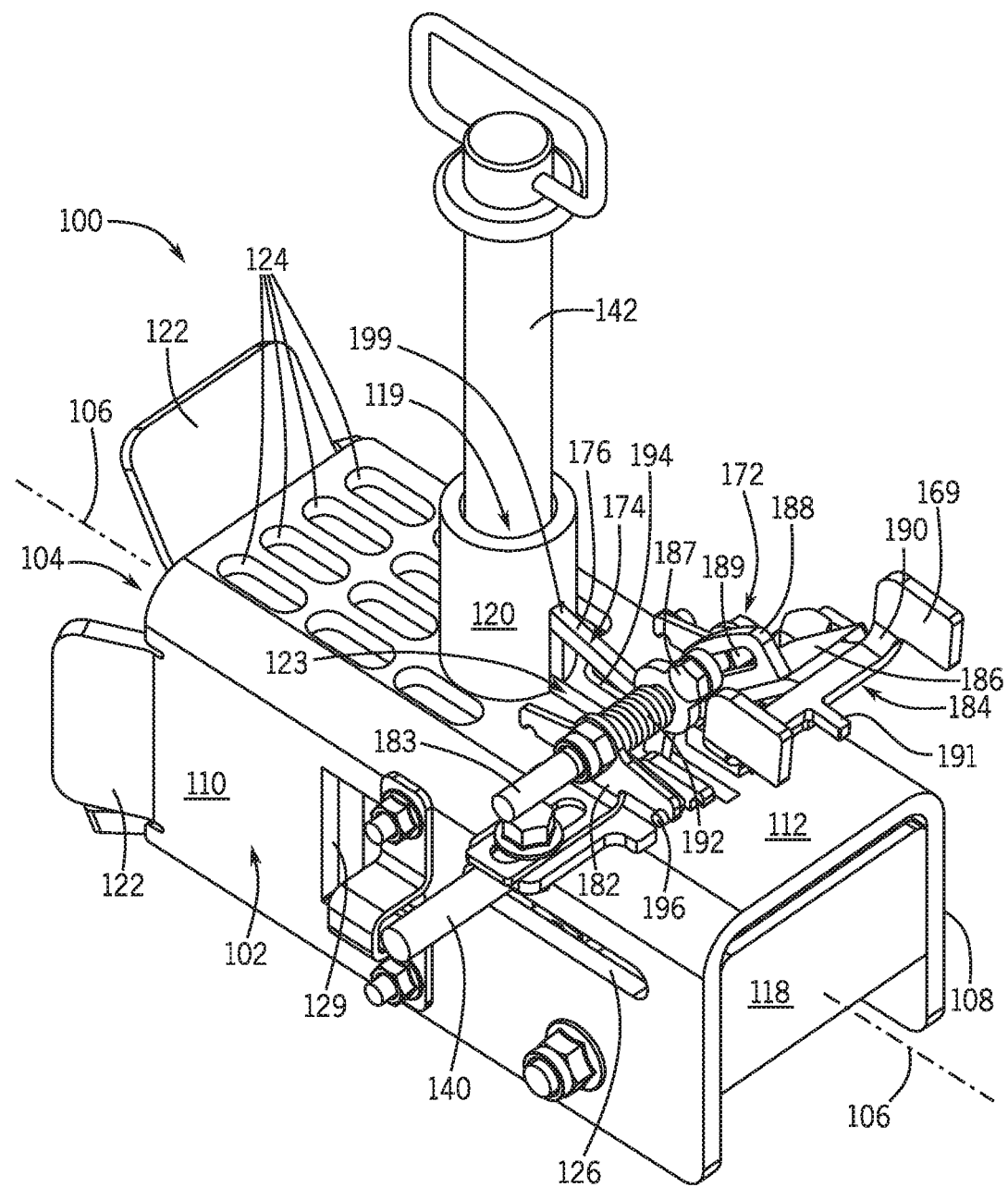
FIG. 1C is a rear perspective view of the hitch mount assembly of FIG. 1B.
Figure 2:
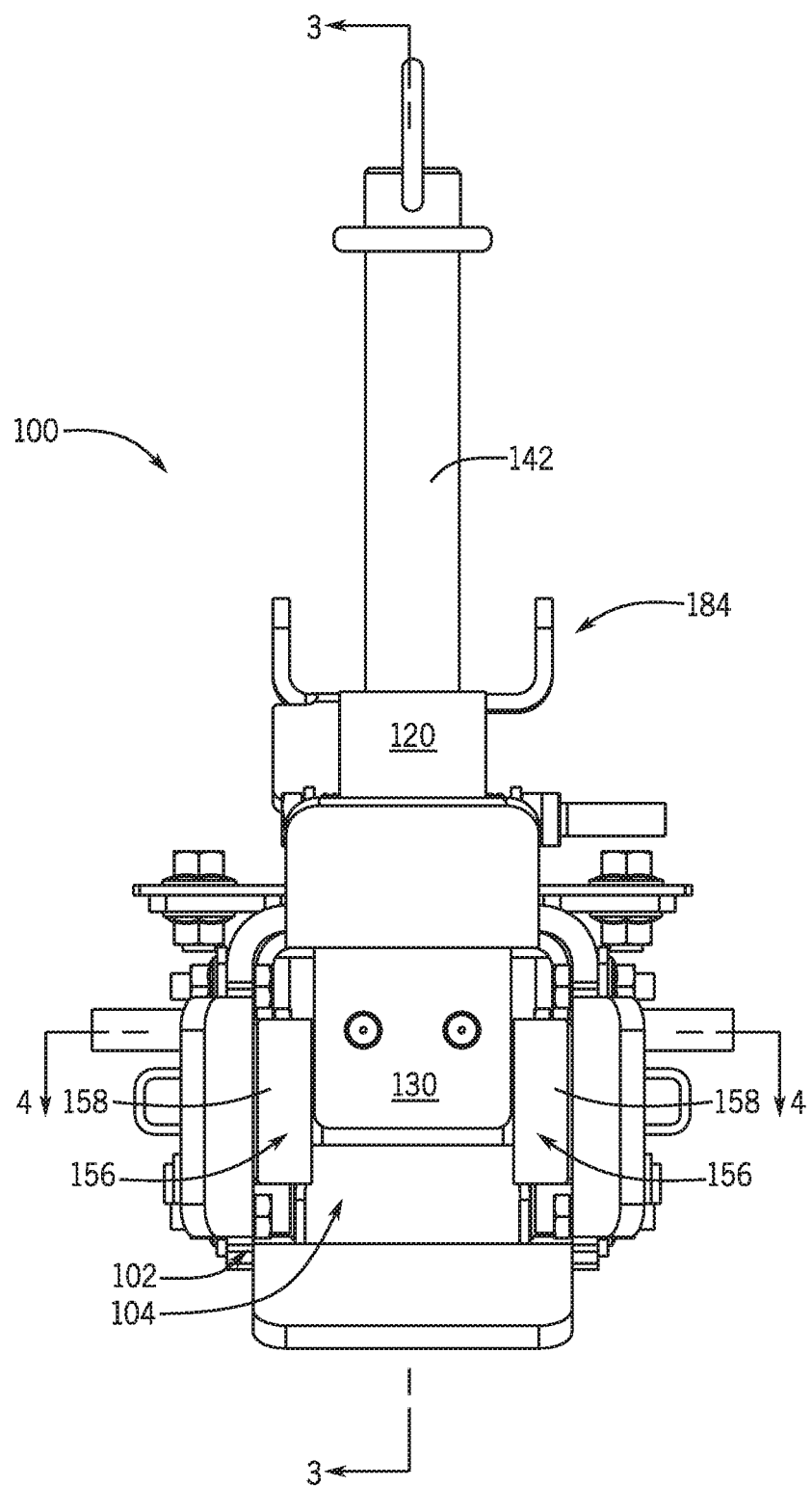
FIG. 2 is a front end view of the hitch mount assembly of FIGS. 1B and 1C.
Figure 3:
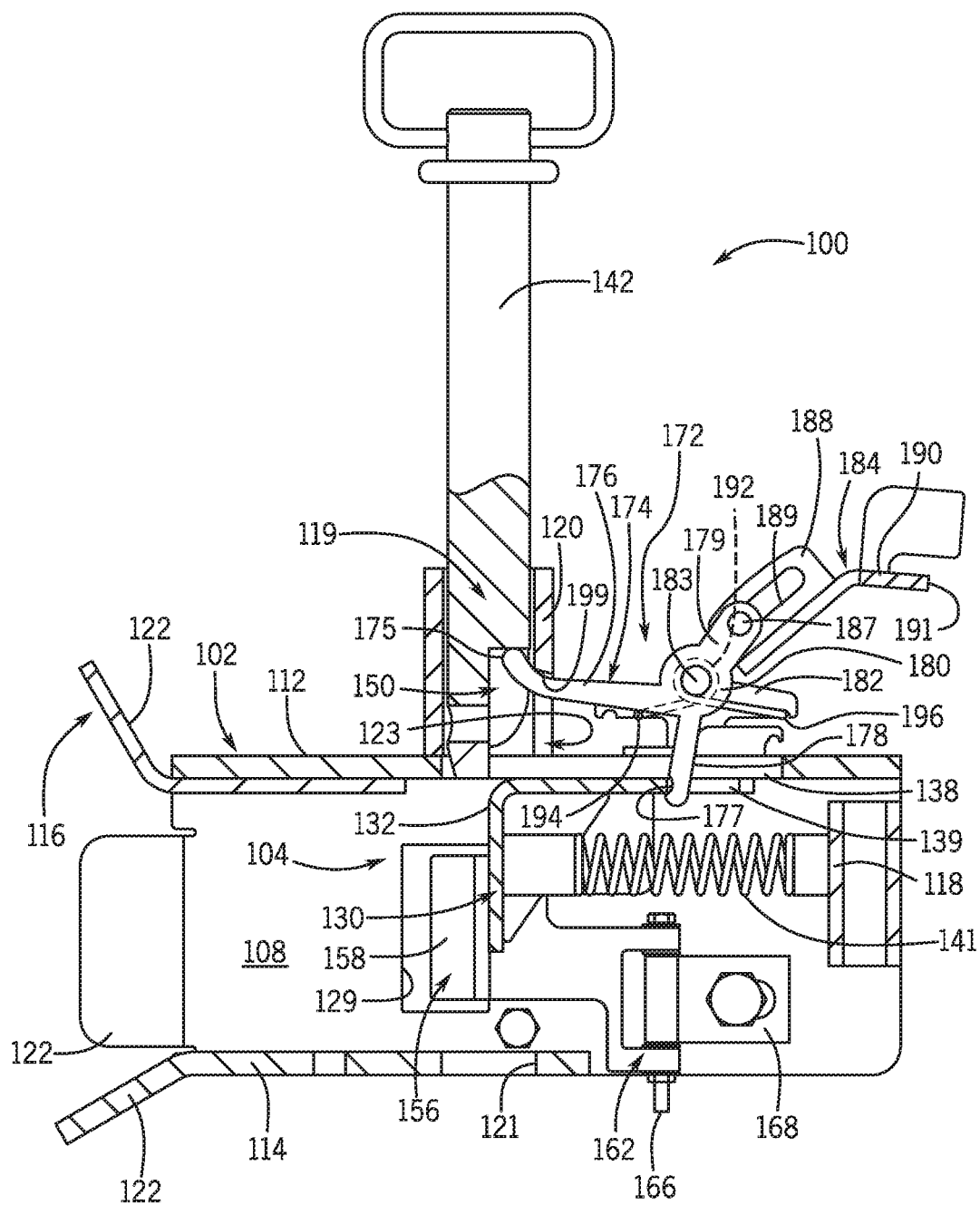
FIG. 3 is a section view of the hitch mount assembly taken along the line 3-3 of FIG. 2.

As mentioned above, the hitch mount assembly 100 may include the drawbar receiver member 102. The drawbar receiver member 102 may be tubular, box-like, and hollow. The drawbar receiver member 102 may be constructed from high-strength, stiff, and robust material. The drawbar receiver member 102 may include a plurality of walls, for example, a first side wall 108, a second side wall 110, a top wall 112, and a bottom wall 114. The walls 108, 110, 112, 114 may cooperate to define a drawbar cavity 104 that extends along an axis 106 (i.e., the travel direction of the drawbar 101 when inserting and withdrawing the drawbar 101). The axis 106 may be substantially straight and linear in some embodiments. The drawbar receiver member 102 may also include a front opening 116 (FIGS. 1B and 3). The front opening 116 may be configured to provide access in and out of the drawbar cavity 104, and the drawbar cavity 104 may be configured to receive the drawbar 101. Furthermore, the drawbar receiver member 102 may include a back end support 118 (FIG. 1C). The back end support 118 may extend between the first and second side walls 108, 110 on an end that is opposite the front opening 116.

The drawbar receiver member 102 may additionally include a pin receiver tube 120. The pin receiver tube 120 may be rounded and may be fixed to the top wall 112. The pin receiver tube 120 may project from the top wall 112, substantially perpendicular to the axis 106 of the cavity 104 (and substantially parallel to the vertical axis 24 included in FIG. 1A. The pin receiver tube 120 may be hollow to define a pin opening 119 (i.e., a pin passage) therein. As shown in FIG. 3, the pin opening 119 may extend through the top wall 112 and may be open to the cavity 104. The hitch mount assembly 100 may additionally include a pin opening 121 formed through the bottom wall 114 as well (FIG. 3). The pin opening 121 (i.e., the lower pin opening) may be substantially aligned with the pin opening 119 (i.e., the upper pin opening). As will be discussed, when attaching the drawbar 101, the pin hole 103 in the drawbar 101 may be aligned with the pin openings 119, 121. Then, the pin 142 may be received within the pin opening 119, the pin hole 103 in the drawbar 101, and the pin opening 121 to attach the drawbar 101 to the hitch mount assembly 100.

As shown in FIGS. 1C and 3, the pin receiver tube 120 and the top wall 112 of the drawbar receiver member 102 may cooperate to define a slot 123. In some embodiments, part of the slot 123 may extend vertically and through the rear side of the pin receiver tube 120, and another part of the slot 123 may extend horizontally and through the top wall 112.

As shown in FIG. 1B, the front opening 116 may be a flared front opening 116. In some embodiments, the side walls 108, 110, the top wall 112, and the bottom wall 114 may cooperate to define the flared front opening 116. More specifically, the side walls 108, 110, the top wall 112, and/or the bottom wall 114 may include respective flared projections 122 that project forward and at an angle away from the axis 106. Accordingly, the front opening 116 may be flared away from the axis 106. At least one flared projection 122 may be fixed (e.g., welded, fastened, etc.) to a respective wall 108, 110, 112, 114. Also, at least one flared projection 122 may be integrally connected with the respective wall 108, 110, 112, 114. As shown in FIG. 3, for example, one flared projection 122 may be fixed to the forward portion of the top wall 112, and the other walls 108, 110, 114 may include integrally connected projections 122. In other embodiments, the flared projections 122 may each be integrally attached to the walls 108, 110, 112, 114 of the drawbar receiver member 102. As will be discussed, the flared front opening 116 may be configured to receive the drawbar 101. In some cases, the drawbar 101 may be misaligned with the cavity 104 such that the drawbar 101 abuts one of the flared projections 122. In this event, the angled surface of the flared projection 122 may guide and direct the drawbar 101 into the cavity 104 and help to align the axis of the drawbar 101 with the axis 106 of the cavity 104.

Moreover, as shown in FIGS. 1B and 1C, the drawbar receiver member 102 may include one or more viewing openings 124. Two or more of the viewing openings 124 may be aligned. In the embodiment shown, there are a series of viewing openings 124 arranged in substantially aligned columns (along the axis 106) and substantially aligned rows (in the lateral direction) on the top wall 112. In another embodiment, there may be one viewing opening 124 that extends between the front opening 116 and the pin receiver tube 120. In an additional embodiment, there may be two viewing openings 124 that are arranged side-by-side on the top wall 112 and that extend between the front opening 116 and the pin receiver tube 120.

The viewing openings 124 may include a plurality of elongate slots that are arranged between the front opening 116 and the pin receiver tube 120. Also, at least one viewing opening 124 may be disposed between the side wall 108 and the pin receiver tube 120 in the lateral direction, and at least one viewing opening 124 may be disposed between the side wall 110 and the pin receiver tube 120 in the lateral direction. In some embodiments, the viewing openings 124 may be elongate with a major axis extending in the longitudinal direction (along the axis 106) and a minor axis extending in the lateral direction (horizontally perpendicular to the axis 106). In other words, each viewing opening 124 may have an open length (major axis) measured along the axis 106 and an open width (minor axis) measured in the lateral direction.

The viewing openings 124, together, may collectively define a "view window" that allow a user to view the interior of the drawbar receiver member 102, for example, when hitching and/or unhitching the drawbar 101 from the hitch mount assembly 100. This view window may have a total length that is a total of the open lengths of the viewing openings 124. The view window may also have a total width that is a total of the open widths of the viewing openings 124. The total length of the view window may be greater than the total width of the view window. This is evident in the illustrated embodiment because the elongate, major axes of the viewing openings 124 are substantially aligned and parallel to the axis 106. However, it will be appreciated that the viewing openings 124 may be configured differently without departing from the scope of the present disclosure. In some embodiments, the elongate shape, orientation, and/or position of the viewing openings 124 on the top side of the drawbar receiver member 102 may allow the user to conveniently see into the cavity 104 while seated inside the operator cabin 26 during the hitching/unhitching operation.

The drawbar receiver member 102 may further include additional apertures (e.g., slots, holes, recesses, etc.). These apertures may be configured to receive and/or support other elements of the hitch mount assembly 100. These apertures will be discussed below in connection with the description of the other elements.

As mentioned above, the hitch mount assembly 100 may include the pin 142. The pin 142 is shown in detail in FIG. 6. The pin 142 may include a shaft 144. The shaft 144 may be substantially cylindrical and may have a straight longitudinal axis. The pin 142 may also include a handle end 146 configured to be grasped and manipulated by a user. The pin 142 may further include an insertion end 148. The insertion end 148 may be inserted and received within the drawbar 101. The insertion end 148 may be disposed opposite the handle end 146. In some embodiments, the insertion end 148 may include a relatively flat, radial surface formed thereon.

Figure 6:
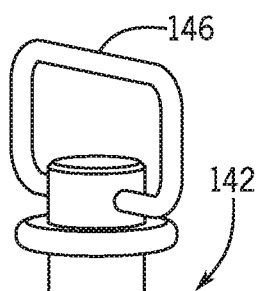
FIG. 6 is an isometric view of a pin of the hitch mount assembly of FIGS. 1B and 1C.

Additionally, the insertion end 148 may include a rear side aperture 150. As will be discussed, the rear side aperture 150 may be configured to engage another element for retaining the pin 142 in one or more positions. In some embodiments, the rear side aperture 150 may be a recess that extends inward in the radial direction and that extends longitudinally from the flattened insertion end 148. The rear side aperture 150 may include one or more tapered portions 152 and an axial portion 154. As shown in FIG. 6, there may be two tapered portions 152 disposed symmetrically on opposite sides of the axial portion 154. The axial portion 154 may be substantially parallel to the longitudinal axis of the pin 142. The tapered portions 152 may be tapered at an angle with respect to the longitudinal axis of the pin 142.

The hitch mount assembly 100 may additionally include an actuator member 130. The actuator member 130 may be configured and referred to as a "trigger member" in some embodiments of the present disclosure. The actuator member 130 is shown attached in FIGS. 2-4 and is shown in isolation in FIG. 5. The actuator member 130 may be made from one or more plates of high strength, stiff, and robust material. In some embodiments, the actuator member 130 may be made from bent steel plate. As shown in FIG. 5, the actuator member 130 may include a front abutment plate 132, side supports 134, and a top engagement plate 136. The top engagement plate 136 may include a latch engagement aperture 138. The latch engagement aperture 138 may be a notch, cut-away, or other opening and may be partially defined by an edge 139. The latch engagement aperture 138 may be disposed centrally on the top engagement plate 136, opposite the front abutment plate 132.

One or more rods 140 (FIGS. 1B, 1C, 4) may be fixed to and may extend through the side supports 134 of the actuator member 130. The rods 140 may be received within respective side slots 126 of the drawbar receiver member 102 to thereby moveably couple the actuator member 130 to the drawbar receiver member 102. In some embodiments, the side slots 126 are elongate and substantially parallel to the axis 106 of the drawbar receiver member 102. As such, the rod 140 and the attached actuator member 130 may slide back and forth along the axis 106. The rods 140 may abut and slide against the edge of the side slots 126 to thereby guide the sliding movement of the actuator member 130 along the axis 106. The rods 140 may abut against the forward ends of the slots 126 to limit movement of the actuator member 130 in the forward direction along the axis 106.

Figure 4:
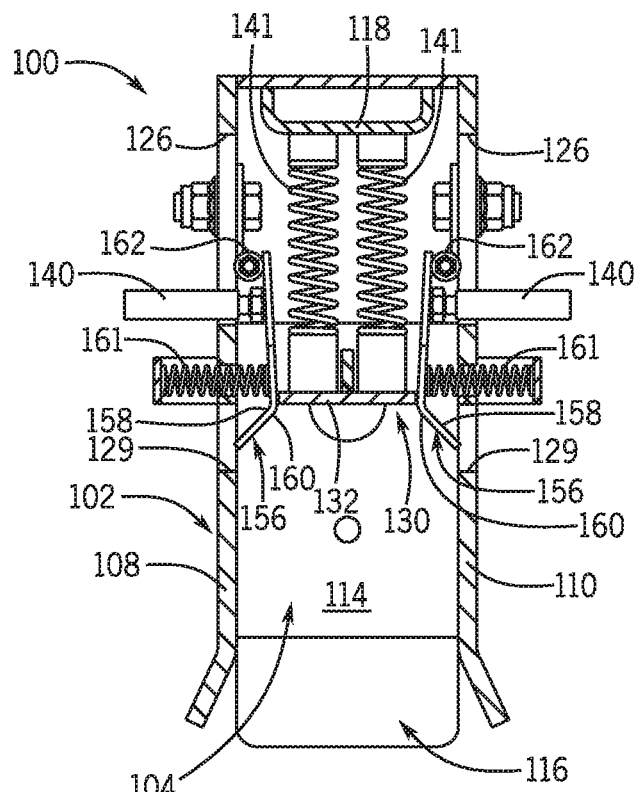
FIG. 4 is a section view of the hitch mount assembly taken along the line 4-4 of FIG. 2.
Figure 5:
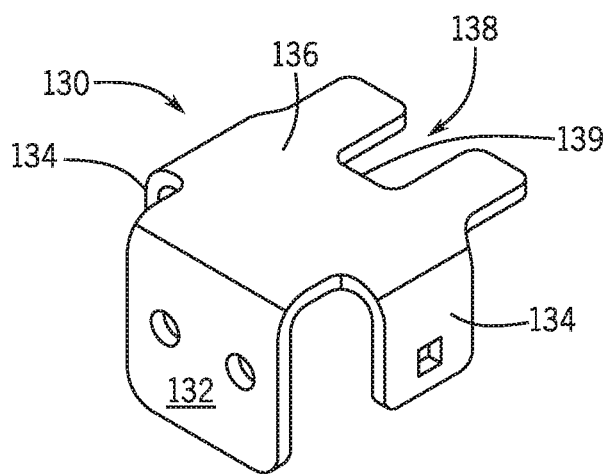
FIG. 5 is an isometric view of an actuator member of the hitch mount assembly of FIGS. 1B and 1C.

As shown in FIGS. 3 and 4, the hitch mount assembly 100 may further include one or more biasing members 141. The biasing members 141 may be of any suitable type, such as compression springs. One end of the biasing member 141 may be fixed to the back end support 118 of the drawbar receiver member 102, and an opposite end of the biasing member 141 may be fixed to the backside of the front abutment plate 132 of the actuator member 130. As such, the biasing members 141 may apply a biasing force to the actuator member 130.

More specifically, as will be discussed in detail, the actuator member 130 may be configured to move between a first, neutral position (shown, for example, in FIGS. 3 and 9A) and a second, displaced position (shown, for example, in FIG. 9C). When moving from the neutral position to the displaced position, the actuator member 130 may move against the biasing force supplied by the biasing members 141. In the illustrated embodiment, therefore, the biasing members 141 bias the actuator member 130 toward the neutral position and away from the displaced position.

Additionally, the hitch mount assembly 100 may include at least one alignment member 156 as shown in FIGS. 3 and 4. In the embodiment illustrated, there may be a pair of alignment members 156, wherein one is supported by the first side wall 108 and the other is supported by the second side wall 110. An example alignment member 156 may include an abutment plate 158. The abutment plate 158 may be bent to include an angled portion 160 that faces the front opening 116 and a mounting portion 162 that extends axially along the respective side wall 108, 110. As shown in FIG. 3, the mounting portion 162 may be forked and may be attached via a fastener 166 to a mounting bracket 168. The mounting bracket 168 may be fixed to the respective side wall 108, 110 on the interior of the cavity 104. The fastener 166 may pivotally couple the abutment plate 158 to the drawbar receiver member 102. Furthermore, as shown in FIGS. 1B and 4, the alignment members 156 may include respective biasing members 161 for biasing the respective abutment plates 158 inward, toward the axis 106, relative to the respective side wall 108, 110. The biasing members 161 may be compression springs that are supported by the respective side wall 108, 110. The abutment plates 158 may be pushed and rotated outward and away from the axis 106, against the biasing force supplied by the biasing member 161. Also, in some embodiments, the side walls 108, 110 of the drawbar receiver member 102 may include windows 129 (FIG. 4) that receive the angled portion 160 of the abutment plate 158.

As shown in FIG. 4, the angled portion 160 of the abutment plate 158 provides a surface that is disposed at an angle relative to the axis 106 of the cavity 104. Also, the angled portions 160 of the abutment plates 158 may be disposed on opposite sides of the front abutment plate 132 of the actuator member 130. Accordingly, when the drawbar 101 is inserted into the cavity 104 and is misaligned with the axis 106, the drawbar 101 may initially abut against the angled portion 160 of one of the abutment plates 158. That abutment plate 158 may push against the respective biasing member 161 for applying a reaction force to the drawbar 101. The opposite abutment plate 158 and biasing member 161 may apply less (or no) reaction force. As a result, the drawbar 101 and the drawbar receiver member 102 may generally be pushed toward an aligned position. More specifically, as explained above, the forces applied to the opposing alignment members 156 may be different, and these imbalanced forces may transfer to the drawbar receiver member 102, causing the drawbar receiver member 102 to move into alignment with the drawbar 101. Also, there may be slack between attached components, either in the hitch mount assembly 100, in components that are attached to the hitch mount assembly 100, and/or in components that are attached to the drawbar 101. This slack may cause the above-described alignment as the drawbar 101 abuts the alignment members 156. In some embodiments, the alignment member 156 may allow the hitch mount assembly 100 to rotate relative to the drawbar 101 about the vertical axis 24 (i.e., the yaw axis) as shown in FIG. 1A.

Figure 7:
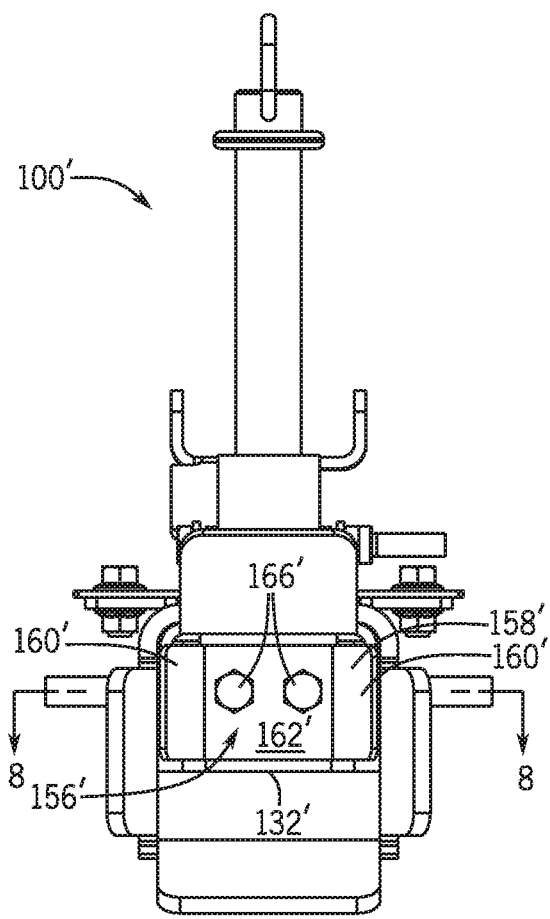
FIG. 7 is a front end view of the hitch mount assembly with a drawbar alignment member according to an additional embodiment.
Figure 8:
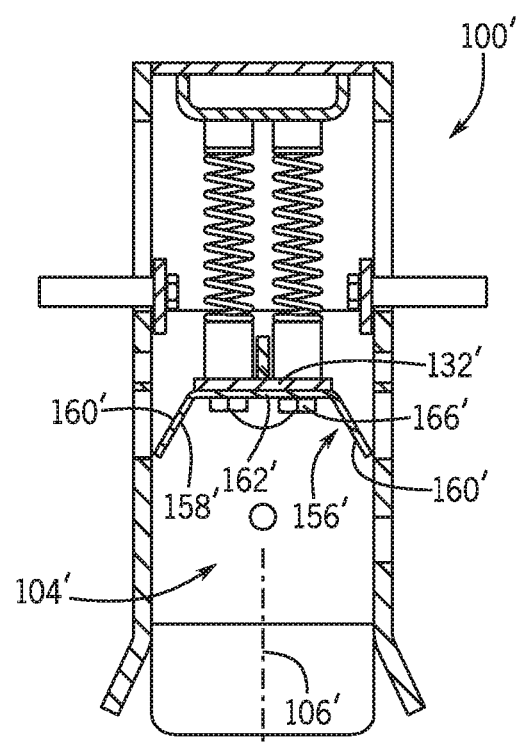
FIG. 8 is a section view of the hitch mount assembly taken along the line 8-8 of FIG. 7.

FIGS. 7 and 8 illustrate an additional embodiment of the alignment member 156' of the hitch mount assembly 100'. In the embodiment of FIGS. 7 and 8, the alignment member 156' includes an abutment plate 158' with a mounting portion 162' that is fixed to the front abutment plate 132' via fasteners 166'. The abutment plate 158' may also include angled portions 160' that extend away from opposite sides of the mounting portion 162'. The angled portions 160' may provide a surface that is disposed at an angle relative to the axis 106' of the cavity 104' (FIG. 8). The alignment member 156' may align the drawbar and the hitch mount assembly 100' similar to the embodiment of FIGS. 1B-6. Specifically, as the drawbar 101 advances toward the alignment member 156', the drawbar 101 may apply more force to one of the abutment plates 158'. This may create a force imbalance between the abutment plates 158', causing the hitch mount assembly 100' and drawbar 101 to move toward alignment.

The following discussion of the hitch mount assembly will now refer back to the embodiment of FIGS. 1B-6. However, it will be appreciated that this discussion may apply also to the embodiments of FIGS. 7 and 8.

As shown in FIGS. 1B and 1C, the hitch mount assembly 100 may include a pin retainer mechanism 172. The pin retainer mechanism 172 may generally engage the pin 142 in one position, and the pin retainer mechanism 172 may also disengage the pin 142 in another position. Also, the pin retainer mechanism 172 may be biased toward the first position, engaging the pin 142. In some embodiments, the pin retainer mechanism 172 may be configured to automatically release the pin 142 for hitching the drawbar receiver member 102 and the drawbar 101 together. The pin retainer mechanism 172 may also be configured for automatically returning the pin 142 to its first position, ready to hitch the towing vehicle 20 and the towed vehicle 22 together.

As shown in FIG. 3, the pin retainer mechanism 172 may include a latch 174. The latch 174 may be a unitary member made from a high strength and stiff material, such as steel. The latch 174 may also be relatively flat and thin. The latch 174 may include a rounded mount portion 180 and a plurality of projections that substantially extend radially away from the mount portion 180. These projections may be referred to as "fingers" of the latch 174. A first finger 176 extends substantially radially away from the mount portion 180. In some embodiments, the first finger 176 may extend substantially straight away from the mount portion 180 but may include an upturned end 175. The latch 174 may also include a second finger 178 that extends substantially radially away from the mount portion 180. The second finger 178 may be shorter than the first finger 176 in the radial direction. The second finger 178 may be spaced approximately ninety degrees (90°) away from the first finger 176. Also, the second finger 178 may include a notch 177. The latch 174 may further include a third finger 179 that extend substantially radially away from the mount portion 180. The third finger 179 may be shorter than the second finger 178. Also, the third finger 179 may be substantially opposite the second finger 178 in the circumferential direction about the mount portion 180. The mount portion 180 of the latch 174 may be moveably mounted to the drawbar receiver member 102. For example, the mount portion 180 may be rotatably attached to a mounting bracket 182 via a pin 183 (FIGS. 1B and 1C).

Figure 9A:
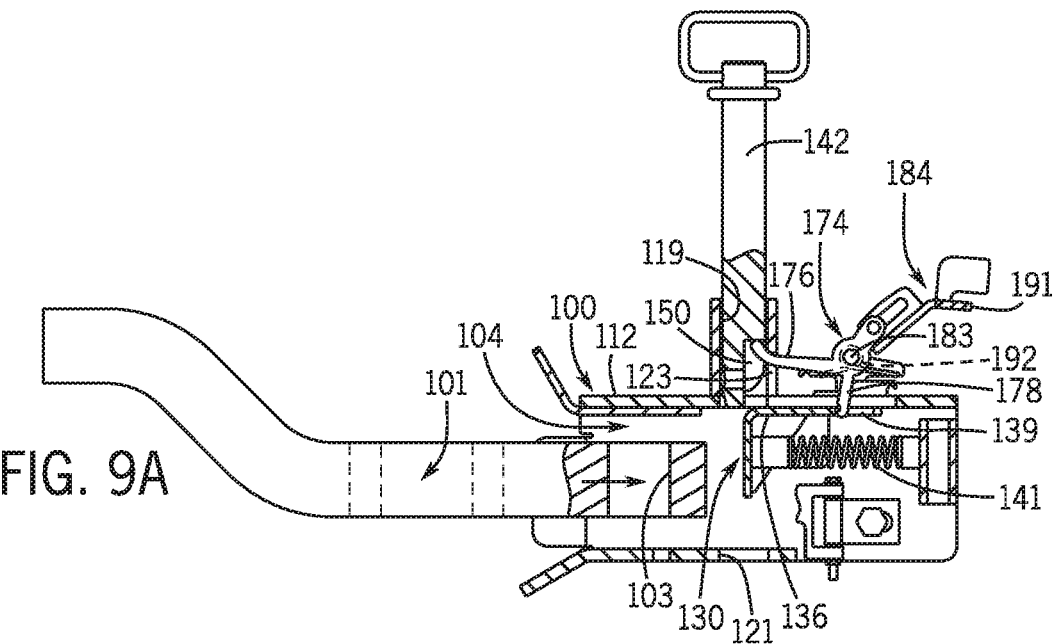
Figure 9B:
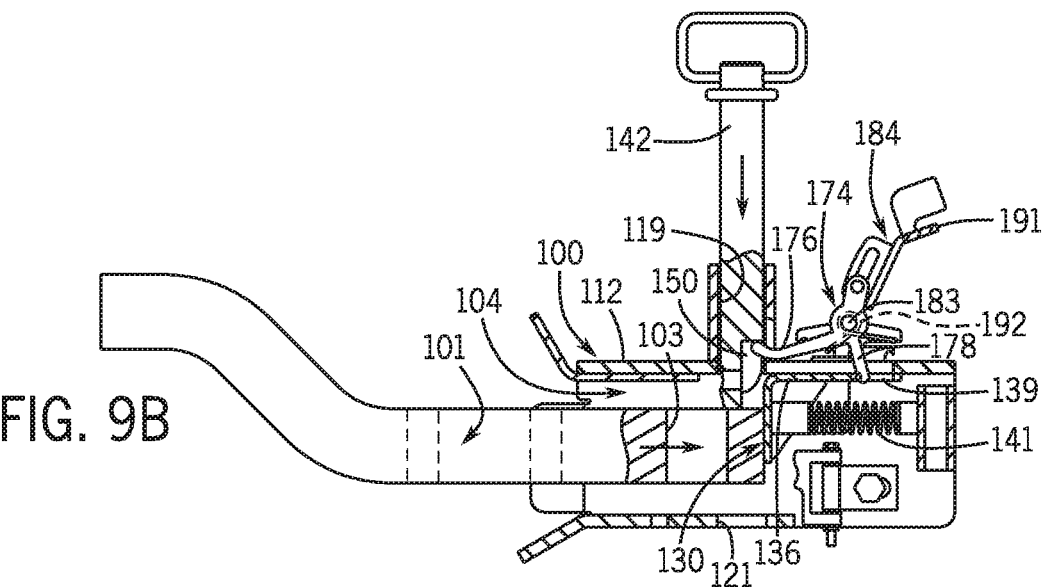
Figure 9C:
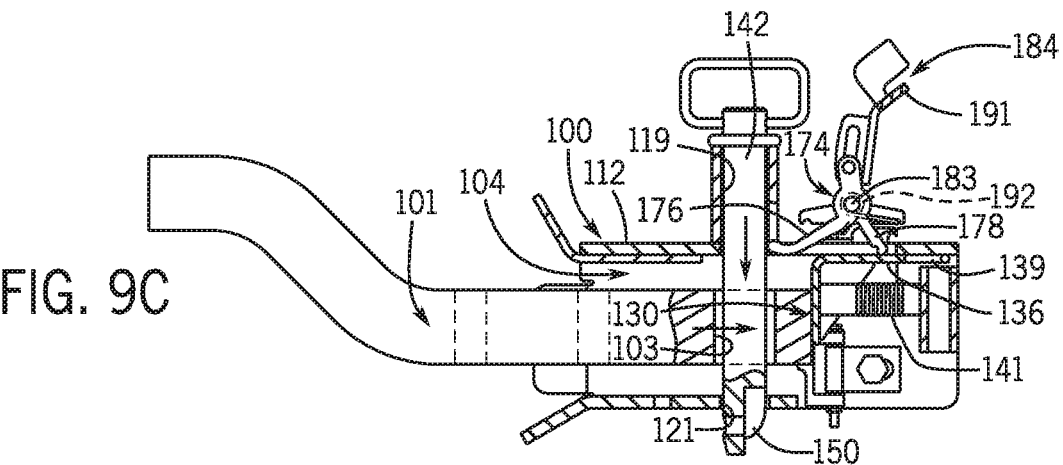

As such, the latch 174 may rotate about the axis of the pin 183 between a first position (FIG. 9A) and a second position (FIG. 9C). FIG. 9B may represent an intermediate position of the latch 174, which is defined rotationally between the first position of FIG. 9A and the second position of FIG. 9C. In the first position (FIG. 9A), the upturned end 175 of the first finger 176 may be received in the slot 123 of the drawbar receiver member 102 and the rear side aperture 150 of the pin 142 for supporting the pin 142 in a retracted position. In the second position (FIG. 9C), the first finger 176 may be disposed outside the rear side aperture 150 of the pin 142, allowing the pin 142 to move to its extended position under the force of gravity. As shown in FIG. 9C, the upturned end 175 may remain substantially outside the cavity 104. For example, in the second position (FIG. 9C), the lower edge of the upturned end 175 may be substantially flush with the top wall 112 of the receiver member 102.

Furthermore, the second finger 178 of the latch 174 may engage with the actuator member 130. For example, the edge 139 (FIG. 3) of the latch engagement aperture 138 of the actuator member 130 may be received within the notch 177 to abut against the second finger 178 as the actuator member 130 moves from its neutral position (FIG. 9A) to its actuated position (FIG. 9C) as will be discussed in detail below. Thus, linear movement of the actuator member 130 may cause coincidental rotation of the latch 174 about the axis of the pin 183.

As shown in FIGS. 1B, 1C and 3, the pin retainer mechanism 172 may further include a pin rest 184. The pin rest 184 may be a unitary member made from a high strength and stiff material, such as steel. The pin rest 184 may also be bent, forged, or otherwise formed to have relatively flat and thin plates that extend away from each other at various angles.

As shown in FIGS. 1B and 1C, the pin rest 184 may include a main body 186 with a mounting projection 188 on one side. The mounting projection 188 may include a slot 189, and a fastener 187 may attach the pin rest 184 to the third finger 179 of the latch 174. In some embodiments, the fastener 187 may moveably attach the pin rest 184 to the third finger 179 of the latch 174. For example, the pin rest 184 may be supported for rotation relative to the latch 174 about the axis of the fastener 187. The pin rest 184 may also be supported for linear movement along the major axis of the slot 189. According, in some embodiments, the pin rest 184 may slide relative to the axis of rotation defined by the fastener 187.

The pin rest 184 may also include a handle 190. In some embodiments, the handle 190 may be a wing-shaped bar of material that extends transversely from the main body 186. In some embodiments, the handle 190 may have upturned ends 169. The pin rest 184 may further include a finger 191 (FIGS. 1B and 1C). The finger 191 may be a projection the projects from a central area of the handle 190.

Accordingly, a user may grasp the handle 190 for manually moving the pin rest 184 between a first position shown in FIG. 3 and a second position shown in FIG. 11A. In some embodiments, the pin rest 184 may be spaced apart from the pin 142 and the pin receiver tube 120 when in the first position (FIG. 3). In contrast, in the second position (FIG. 11A), the pin rest 184 may be rotated about the axis of the fastener 187 such that the finger 191 is received within the pin receiver tube 120 and is able to support the pin 142. In some embodiments, when moving between its different positions (FIGS. 3 and 11A), the pin rest 184 may be flipped and rotated about the axis of the pin 183 and may also slide along the slot 189. Furthermore, as shown in FIG. 11B, a support structure, such as the upturned ends 169 of the handle 190, may abut against the top wall 112 of the drawbar receiver member 102 for supporting the pin rest 184 in the second position.

Moreover, as shown in FIGS. 1B, 1C, and 3, the pin retainer mechanism 172 may include a biasing member 192. The biasing member 192 may be of any suitable type. As shown in the illustrated example, the biasing member 192 may be a torsion spring that is wound about the pin 183. The ends 196 of the biasing member 192 may be fixed and supported on the underside of the mounting brackets 182. Also, an intermediate portion of the biasing member 192 may be substantially helically wound about the pin 183 except for a projected support 194 that projects radially from and turns back toward the pin 183. As shown in FIG. 3, the projected support 194 may be supported on the underside of the first finger 176 (i.e., between the first finger 176 and the top wall 112 of the drawbar receiver member 102).

As such, the biasing member 192 may bias the latch 174 in a single direction (e.g., clockwise as viewed in FIG. 3) relative to the drawbar receiver member 102. Accordingly, the biasing member 192 may bias the latch 174 toward its first position represented in FIGS. 3 and 9A. This biased movement of the latch 174 may be limited by an upper edge 199 of the pin tube slot 123 as shown in FIGS. 1B and 3. Thus, biasing force from the biasing member 192 causes the latch 174 to biasingly support the pin 142 in its retracted position.

Figure 10A:
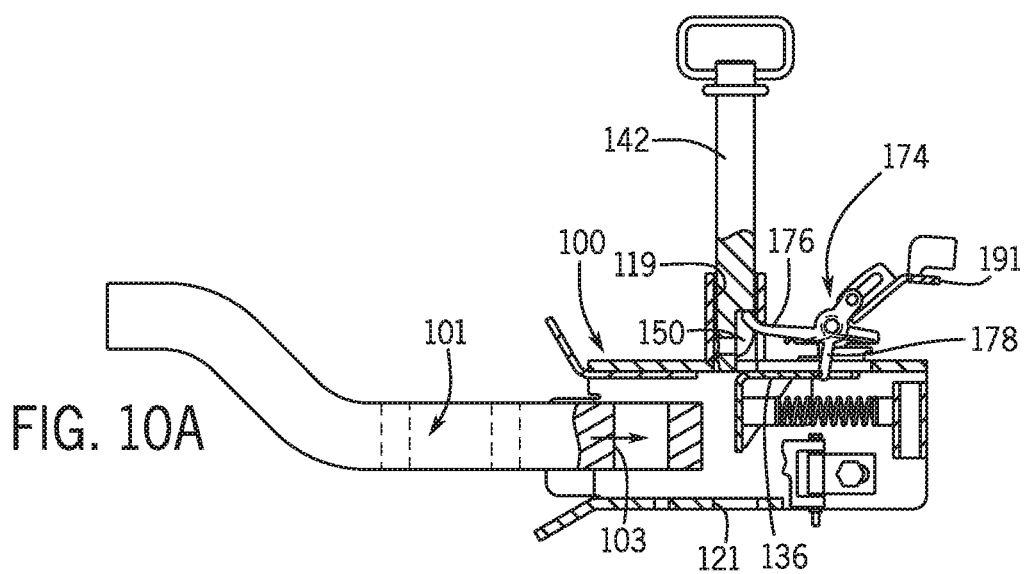
Figure 10B:
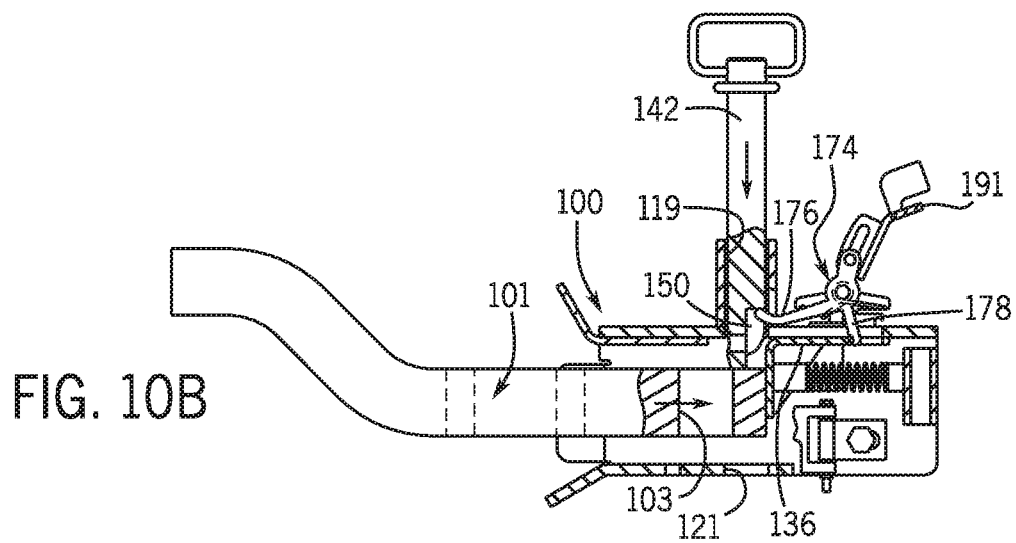
Figure 10C:
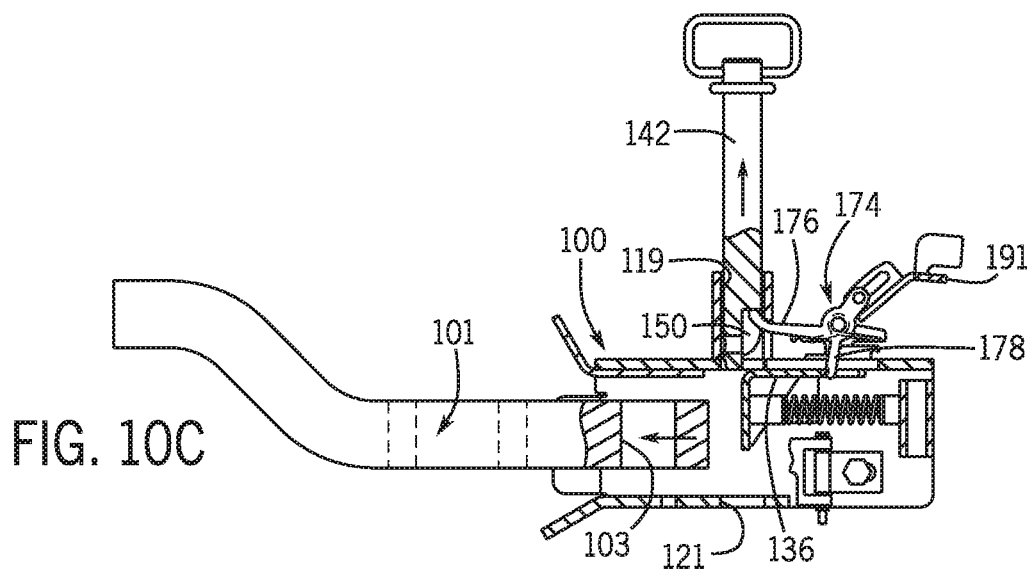

Operation of the hitch mount assembly 100 will now be discussed. The first series of illustrations of FIGS. 9A-9C represents a first operation of the hitch mount assembly 100, the second series of illustrations of FIGS. 10A-10C represents a second operation of the hitch mount assembly 100, and the third series of illustrations of FIGS. 11A-11C represents a third operation of the hitch mount assembly 100. It will be appreciated that these are example embodiments. Other embodiments may vary from these examples without departing from the scope of the present disclosure.

FIGS. 9A-9C represents successful hitching of the hitch mount assembly 100 and the drawbar 101. FIG. 9A shows the drawbar 101 and hitch mount assembly 100 unhitched from each other. The actuator member 130 is shown in its neutral position, the latch 174 is shown in its first position, and the pin rest 184 is shown in its first position. Thus, the first finger 176 of the latch 174 is received within the rear side aperture 150 of the pin 142, and the first finger 176 is biased by the biasing member 192 to retain the pin 142 in its retracted position. As shown, the pin 142 may be disposed completely outside the drawbar cavity 104 when in the retracted position (FIG. 9A) in some embodiments.

The drawbar 101 is shown moving toward the actuator member 130 in FIG. 9A. As shown in FIG. 9B, the drawbar 101 moves into the drawbar cavity 104 and eventually abuts the actuator member 130 and pushes the actuator member 130 toward the actuated (displaced) position against the biasing force provided by the biasing members 141. As shown in FIG. 9B, the edge 139 of the actuator member 130 may push the second finger 178 and, thus, rotate the latch 174 against the force of the biasing member 192 as the actuator member 130 moves toward the actuated (displaced) position.

As shown in FIG. 9C, the drawbar 101 has pushed the actuator member 130 to its actuated position. As a result, the latch 174 is rotated to its second position with the second finger 178 retained against the top engagement plate 136 of the actuator member 130 and with the first finger 176 disengaged from the rear side aperture 150 of the pin 142. Accordingly, gravity causes the pin 142 to automatically drop down within the pin receiver tube 120. In FIG. 9C, the pin hole 103 in the drawbar 101 is aligned with the upper pin opening 119 and the lower pin opening 121; therefore, the pin 142 moves to its extended position, received within the upper pin opening 119, the pin hole 103 of the drawbar 101, and the lower pin opening 121.

FIGS. 10A-10C represent a hitching operation in which the pin hole 103 of the drawbar 101 remains misaligned with the upper pin opening 119 of the hitch mount assembly 100. In this operation, the drawbar 101 is inserted within the cavity 104 (FIG. 10A), but the drawbar 101 is misaligned during the operation (FIG. 10B). Specifically, the upper pin opening 119 and pin hole 103 are shown longitudinally misaligned in FIG. 10B. It will also be appreciated that the upper pin opening 119 and pin hole 103 may be laterally misaligned in FIG. 10B. In the embodiment of FIG. 10B, the pin 142 travels downward into the drawbar cavity 104 enough to come to rest on the drawbar 101. Because the pin hole 103 of the drawbar 101 is misaligned with the upper pin opening 119, the pin 142 does not fall to its extended position. Even in the intermediate and unhitched position of FIG. 10B, the first finger 176 of the latch 174 may remain engaged within the rear side aperture 150 of the pin 142. Accordingly, should the user decide to withdraw the drawbar 101 from the cavity 104 as shown in FIG. 10O, the biasing member 141 may bias the actuator member 130 toward the neutral position, allowing the latch 174 to rotate back toward the first position, returning the pin 142 to its retracted and unhitched position (FIG. 10A). In additional embodiments, the pin 142 may move from the position of FIG. 10A to an intermediate and unhitched position (e.g., with the drawbar 101 advanced further into the cavity 104 than shown in FIG. 10B), and the first finger 176 of the latch 174 may disengage from the pin 142 and may be removed from the rear side aperture 150; however, the first finger 176 may remain within a rotational path for re-engaging the pin 142 upon withdrawal of the drawbar 101.

FIGS. 11A-11C represent an unhitching operation. As shown in FIG. 11A, the drawbar 101 retains the actuator member 130 in its actuated position. Thus, the pin 142 may be pulled manually from the receiver tube 120 as shown. Then, the pin rest 184 may be flipped over and moved from its first position to its second position, thereby moving the finger 191 of the pin rest 184 into the pin tube slot 123 of the pin receiver tube 120. The pin 142 may be re-inserted and supported on the finger 191 of the pin rest 184. The ends 169 of the handle 190 may be supported on the top wall 112 such that the pin rest 184 may support the weight of the pin 142. Also, the tapered portions 152 of the rear side aperture 150 (FIG. 6) may abut against the finger 191 to thereby rotate the pin 142 about its longitudinal axis relative to the pin receiver tube 120 such that the finger 191 is received within the axial portion 154 of the rear side aperture 150.

Next, as shown in FIG. 11B, the drawbar 101 may be withdrawn. This allows the actuator member 130 to bias forward toward its neutral position.

Eventually, biased movement of the actuator member 130 allows the biasing member 192 to bias the latch 174 toward its first position as shown in FIG. 11C. This biased rotation of the latch 174 causes the finger 176 to enter the rear side aperture 150 (FIG. 6) of the pin 142. In the embodiment shown, the biasing force provided by the biasing member 192 rotates the latch 174 and coincidentally causes the pin rest 184 to flip back toward its first position. Accordingly, the hitch mount assembly 100 is automatically re-positioned and ready to re-hitch to the drawbar 101.

It will be appreciated that the hitch mount assembly 100 may provide valuable conveniences for the user. For example, the hitch mount assembly 100 allows the pin 142 to automatically drop from the unhitched, retracted position to its hitched, extended position when hitching the vehicles 20, 22 together (FIGS. 9A-9C). Thus, hitching can be achieved quickly and conveniently. Also, the hitch mount assembly 100 may include the alignment members 156, 156' for aligning the drawbar 101 and the hitch mount assembly 100 as discussed above. Thus, in some embodiments, hitching may be achieved by an individual user (e.g., a driver of the towed vehicle 20).

Also, if the drawbar 101 and hitch mount assembly 100 are misaligned during the hitching operation (FIGS. 10A-10C), the towing vehicle 20 may be driven off to withdraw the drawbar 101, and the pin 142 will return to its retracted position, ready for another hitching attempt. Thus, if there is a single user, there is no need for the user to leave the operator cabin of the towing vehicle 20 to reset the pin 142 for each hitching attempt.

Furthermore, when unhitching (FIGS. 11A-11C) the pin 142 may be removed and temporarily supported on the pin rest 184. Next, the operator of the towing vehicle 20 may withdraw the drawbar 101, and the latch 174 automatically returns the pin 142 to its retracted position, ready for re-hitching. Again, if there is a single user, there is no need for the user to leave the operator cabin to re-set the pin 142.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A pin-drop hitch mount assembly comprising:
    a drawbar receiver that defines a drawbar cavity and a pin opening, the drawbar cavity configured to receive a drawbar;
    a pin that is removably received within the pin opening, wherein the pin is configured to move within the pin opening between a retracted position and an extended position, the pin configured to attach the drawbar to the drawbar receiver when in the extended position, and the drawbar receiver configured to be detached from the drawbar with the pin in the retracted position;
    a latch that is supported for movement between a first position and a second position, the latch, in the first position, being configured to engage the pin and retain the pin in the retracted position, the latch, in the second position, being configured to disengage the pin and release the pin for movement of the pin from the retracted position to the extended position;
    a biasing member that biases the latch toward the first position;
    a pin rest configured to support and retain the pin relative to the drawbar receiver when the latch is in the second position; and
    the pin rest configured to release the pin as the latch biases from the second position to the first position and engages the pin;
    wherein the biasing member is configured to bias the latch from the second position to the first position as the drawbar is withdrawn from the drawbar cavity.

2. The pin-drop hitch mount assembly of claim 1, wherein the pin rest is supported by the drawbar receiver for movement between a third position and a fourth position;
   wherein the pin rest is spaced apart from the pin opening when in the third position;
   wherein the pin rest is arranged to support the pin when in the fourth position;
   wherein the pin rest is configured to be moved to the fourth position when the latch is in the second position;
   wherein the pin is configured to be removed from the pin opening and then supported by the pin rest when the pin rest is in the fourth position.

3. The pin-drop hitch mount assembly of claim 2, wherein the biasing member is configured to bias the latch toward the first position and to coincidentally actuate the pin rest from the fourth position toward the third position.

4. The pin-drop hitch mount assembly of claim 1, wherein the pin rest includes a handle for manually moving the pin rest from a third position to a fourth position.

5. The pin-drop hitch mount assembly of claim 4, wherein the handle includes a support structure that abuts against a wall of the drawbar receiver for supporting the pin rest in the fourth position.

6. The pin-drop hitch mount assembly of claim 5, wherein the support structure is an upturned end of the handle.

7. The pin-drop hitch mount assembly of claim 1, further comprising a pin receiver tube that defines the pin opening;
   wherein the pin receiver tube includes a slot; and
   wherein the pin rest includes a projection that is received within the pin opening via the slot to engage the pin.

8. The pin-drop hitch mount assembly of claim 7, wherein the pin includes an aperture configured to receive the projection of the pin rest;
   wherein the aperture includes an axial portion and a tapered portion, the axial portion being substantially parallel to a longitudinal axis of the pin, the tapered portion being tapered with respect to the longitudinal axis; and
   wherein the tapered portion is configured to abut the projection and rotate the pin for receipt of the projection into the axial portion.

9. The pin-drop hitch mount assembly of claim 1, wherein the latch is supported for rotation about a first axis of rotation relative to the drawbar receiver;
   wherein the pin rest is attached to the latch and is supported for rotation about a second axis of rotation relative to the latch.

10. The pin-drop hitch mount assembly of claim 9, wherein the latch includes a projection that projects radially from the first axis of rotation; and
   wherein the pin rest is attached to the projection.

11. The pin-drop hitch mount assembly of claim 10, wherein the projection is a first projection;
   wherein the latch includes a second projection; and
   wherein the biasing member engages the second projection to bias the latch toward the first position.

12. The pin-drop hitch mount assembly of claim 9, wherein the pin rest is mounted for sliding movement relative to the second axis of rotation.

13. The pin-drop hitch mount assembly of claim 1, wherein the biasing member is a first biasing member;
   further comprising an actuator member supported by the drawbar receiver for movement between a neutral position and a displaced position, the actuator member configured to be pushed toward the displaced position by the drawbar advancing into the drawbar receiver, wherein the actuator member is configured to actuate the latch toward the second position against a biasing force of the first biasing member; and
   further comprising a second biasing member that biases the actuator member toward the neutral position.

14. The pin-drop hitch mount assembly of claim 1, further comprising a view window extending through a wall on a top side of the drawbar receiver; and
   wherein the view window is configured for viewing movement of the drawbar within the drawbar cavity relative to the drawbar receiver.

15. A method of operating a pin-drop hitch mount assembly that includes a drawbar receiver, a pin, a latch, and a pin rest, the method comprising:
   removing the pin from a pin opening of the drawbar receiver to unhitch the drawbar receiver from a drawbar;
   supporting the pin on the pin rest after removing the pin;
   withdrawing the drawbar from the drawbar receiver with the pin supported on the pin rest; and
   biasing the latch to engage the pin and release the pin from the pin rest upon withdrawing the drawbar, the latch engaging the pin in an unhitched position;
   wherein the pin rest is supported by the drawbar receiver for movement between a third position and a fourth position, wherein the pin rest is spaced apart from the pin opening when in the third position, and wherein the pin rest is arranged to support the pin when in the fourth position.

16. The method of claim 15,
   further comprising manually moving the pin rest from the third position to the fourth position after removing the pin from the pin opening.

17. The method of claim 16, wherein biasing the latch coincidentally actuates the pin rest from the fourth position toward the third position.

18. The method of claim 16, wherein the drawbar receiver includes a pin receiver tube that defines the pin opening, wherein the pin receiver tube includes aperture; and
   wherein manually moving the pin rest from the third position to the fourth position includes moving a projection of the pin rest into the aperture to engage the pin.

19. A pin-drop hitch mount assembly comprising:
   a drawbar receiver that defines a drawbar cavity and a pin receiver tube that defines a pin opening that is open to the drawbar cavity, the drawbar cavity configured to receive a drawbar;
   a pin that is removably received within the pin opening of the pin receiver tube, wherein the pin is configured to move within the pin opening between a retracted position and an extended position, the pin configured to attach the drawbar to the drawbar receiver when in the extended position, and the drawbar receiver configured to be detached from the drawbar with the pin in the retracted position;
   a latch that is supported by the drawbar receiver for rotational movement between a first position and a second position, the latch, in the first position, being configured to engage the pin and retain the pin in the retracted position, the latch, in the second position, being configured to disengage the pin and release the pin for movement of the pin from the retracted position to the extended position;
   a biasing member that biases the latch toward the first position;
   a pin rest that is supported by the drawbar receiver for rotational movement between a third position and a fourth position, the pin rest including a projection, the pin rest being spaced apart from the pin opening when in the third position, the projection of the pin rest being received within the pin opening and configured to engage the pin when the pin rest is in the fourth position and the latch is in the second position; and the pin rest configured to release the pin as the latch biases from the second position to the first position and engages the pin.

* * * * *